C. THIEBAUT.

CHAIN MACHINE FOR THE MANUFACTURE OF CORRUGATED CARDBOARD.

APPLICATION FILED JAN. 10, 1913.

Reissued June 24, 1913. 13,583.

WITNESSES

F. Diehl.

J. Richards

INVENTOR

C. Thiebaut

BY

Wm. A. Megrath

ATTORNEY

UNITED STATES PATENT OFFICE.

CAMILLE THIEBAUT, OF VITRY-SUR SEINE, FRANCE, ASSIGNOR TO XAVIER PENE, OF OZONE PARK, NEW YORK.

CHAIN-MACHINE FOR THE MANUFACTURE OF CORRUGATED CARDBOARD.

13,583. Specification of Reissued Letters Patent. Reissued June 24, 1913.

Original application filed April 1, 1903, Serial No. 150,660. Divided and application filed August 31, 1904, Serial No. 222,900. Original No. 810,891, dated January 23, 1906. Application for reissue filed January 10, 1913. Serial No. 741,359.

*To all whom it may concern:*

Be it known that I, CAMILLE THIEBAUT, a citizen of the French Republic, residing at Vitry-sur-Seine, France, have invented certain new and useful Improvements in Chain-Machines for the Manufacture of Corrugated Cardboard, of which the following is a specification.

This invention relates to improvements in chain machines for the purpose of obtaining a novel corrugated cardboard.

Plaited, waved or corrugated cardboards as hitherto manufactured do not present sufficient rigidity for large packages. It is true that in some cases there has been stuck to one or both sides of sheets of corrugated cardboard a smooth sheet uniting all the corrugations situated upon the same side; but the product so obtained is expensive, inextensible and only imperfectly resists compression exerted at right angles to the original plane surface of the corrugated sheet.

The conditions which should be fulfilled by corrugated cardboard are as follows: First, the cost price should be exceedingly small; second, the weight should be as small as possible; third, the cardboard should present the greatest possible resistance to the efforts of compression which it may have to support either in the direction of the original plane surface before corrugation or at right angles to this plane; fourth, constant extensibility for the purpose of permitting the cardboard to be shaped as regularly as possible to the objects to be packed and of causing it to assume the form of packages of the most various kinds, such as flagons or bottles. I obtain a cardboard fulfilling all these conditions by means of the improvement in known chain machines hereinafter described.

Figure 1:
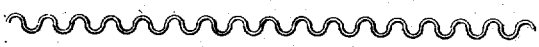
Figure 2:
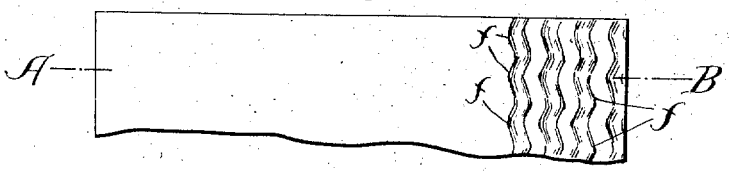
Figure 3:
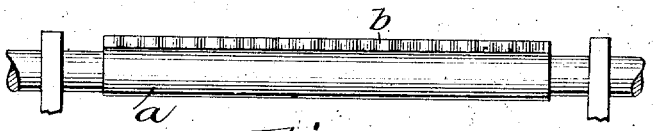
Figure 4:
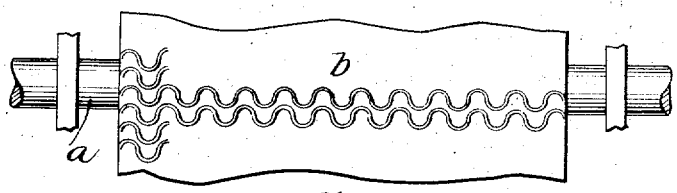
Figure 5:
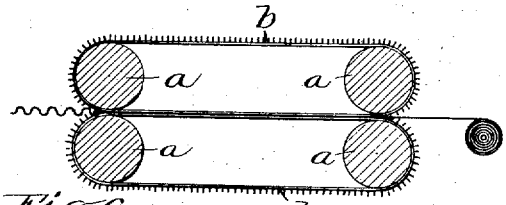
Figure 6:
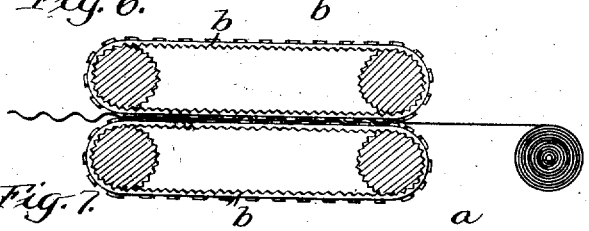
Figure 7:
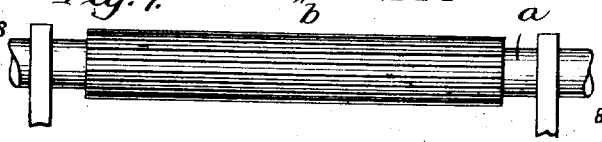

In the accompanying drawings: Figure 1 is a section on the line A, B, of Fig. 2. Fig. 2 is a plan view of my novel corrugated cardboard. Fig. 3 is an elevation of the fluted shaft for driving the endless chains. Fig. 4 is a plan view showing the relative positions of the fluted shaft and its endless chain. Fig. 5 is a sectional view showing two endless chains pressing a sheet of cardboard. Fig. 6 is a sectional view of the endless belts and rollers, showing the fluted arrangement of the same. Fig. 7 is a plan view of one of the rollers.

In chain machines the driving is effected by means of gear wheels cast upon the shaft. When the paper or other substance to be treated is of small thickness, the folds or undulations are produced without difficulty; but when the substance to be treated is of any considerable thickness, the blades of the chains, which are only supported at a few points in their length, cannot sufficiently support the effort which they must overcome, this effort consisting in forcing the cardboard to assume the profile of the blades of the chains without rupture.

The improvement which I have introduced into the construction of machines of this kind consists in providing the driving shafts *a* with grooves throughout their entire length in such a manner as to produce the driving of these chains *b* equally throughout their width. This improvement, owing to the security which it affords in the operation of the machine, permits of obtaining a corrugated cardboard presenting all the characteristics enumerated above. It permits in particular of giving to the blades of the chains absolute rigidity, obviating give, so as to certainly effect the displacement of the cardboard and the pressing action of the blades. This novel cardboard is provided in the usual manner with corrugations, which are formed alternately above and below the original plane of the sheet; but instead of being smooth and continuous throughout their length, these corrugations are formed with protuberances, ribs, or projections *f*, at greater or less intervals one from the other, which, so to speak, convert each of the folds, undulations or corrugations into a reinforced beam and the sheet of cardboard as a whole into a series of rigidly connected reinforced beams. It will be readily understood that these protuberances impart to the corrugations considerable capacity for resisting pressure which may be exerted in a direction at right angles to the original plane of the sheet of cardboard and that they render unnecessary the employment of the auxiliary sheet of cardboard stuck to the summits of each of the corrugations which has been referred to above. The absence of this reinforcing sheet results in a diminution of weight and reduction of the cost of manufacture, since the protuberances in question are obtainable in a single pressing operation. These protuberances also impart to the sheet perfect extensibility and permit it to adapt itself to all kinds of packages.

Having now described my invention what I claim and desire to secure by Letters Patent is:

1. A machine for the manufacture of corrugated cardboard, having driving shafts provided with grooves throughout their entire length, chains passing over said driving shafts having on their under side grooves corresponding to the grooves of the shafts, and means for passing a sheet of cardboard between the chains of the machine.

2. In a machine for the manufacture of corrugated cardboard or paper, the combination of a plurality of endless belts having corrugated outer faces and grooved inner faces and arranged one above the other with their adjacent runs in contact, and a plurality of rollers for supporting and driving the belts, and provided with grooves co-acting with ribs formed by the grooves of the belts.

3. In a machine for the manufacture of corrugated cardboard or paper, the combination of a plurality of endless belts having undulatory corrugations on their outer faces and grooves on their inner faces and arranged one above the other with their adjacent runs co-acting.

4. In a machine for the manufacture of corrugated cardboard or paper, a pair of endless belts each having undulatory corrugated blades on the outer surface thereof, said belts being so arranged that a certain part of one belt will be adjacent to a part of the other belt and the corrugations of the blades of one belt will intermesh with the corrugations of the blades of the other belt, means for positively driving the belts adapted to keep the blades rigidly to their work.

5. In a machine for the manufacture of corrugated cardboard, a pair of endless belts having undulatory blades connected to the outer surface thereof, the opposite surface having a series of transverse grooves, a pair of rollers supporting each belt and arranged transversely thereof, said rollers having longitudinal grooves meshing with ribs formed by the grooves of the belt, said rollers being so arranged that a certain portion of one belt will be adjacent to a part of the other and one roller of one pair will be adjacent a roller of the other pair, whereby the blades will intermesh and will be held with rigidity as they pass over the said rollers.

In testimony whereof I, the said Camille Thiebaut have hereunto set my hand this second day of December 1912.

CAMILLE THIEBAUT.

Witnesses:
Antonio Sabatier,
Lucien Memminger.